Figure 1:
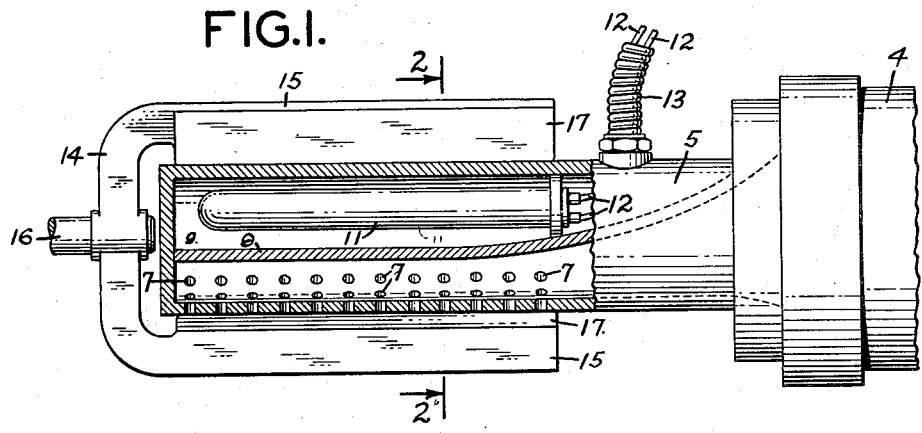

Sept. 29, 1953 R. P. PIPEROUX 2,653,350
APPARATUS FOR FORMING PELLETS OF PLASTIC MATERIAL
Filed Aug. 11, 1950

INVENTOR.
RENE P. PIPEROUX
BY
ATTORNEYS.

Patented Sept. 29, 1953

2,653,350

UNITED STATES PATENT OFFICE 2,653,350

APPARATUS FOR FORMING PELLETS OF PLASTIC MATERIAL

Rene P. Piperoux, Radburn, N. J., assignor to Celanese Corporation of America, New York, N. Y., a corporation of Delaware Application August 11, 1950, Serial No. 178,773

4 Claims. (Cl. 18—12)

1

This invention relates to the production of molding material, and relates more particularly to apparatus for producing plastic molding material in the form of discrete particles such as pellets.

In the molding of plastic material, particularly by injection molding operations, it is desirable that the molding material be in the form of uniformly sized discrete particles. In some injection molding operations, molding pellets of very small size, i. e. on the order of $\frac{1}{16}''$ by $\frac{1}{16}''$ by $\frac{1}{16}''$, have been found to be highly satisfactory. Prior processes and devices for producing pellets of such size have been found to be unsuitable, either from a mechanical standpoint or economical standpoint, or both. Thus, where pellets were made by longitudinally slitting a sheet of heat-softened plastic material to form ribbons of the desired width and then transversely cutting the ribbons to form pellets, it was found that when the disc cutting knives, normally employed, were placed close enough together to form ribbons of substantially $\frac{1}{16}$ of an inch in width it was impossible to extricate the cut ribbons and furthermore in the transverse cutting operations the pellets did not always separate from each other.

Where pellets were made by extruding strands of plastic material from the vertical face of a die having a plurality of extrusion orifices in front of which a fly knife was rotated to sweep across the face of the die to periodically cut off the strands into short pieces or pellets, it was found that the number of orifices that could be employed conveniently had to be limited in order that the pellets as they were cut could clear each other and not mass, i. e. adhere to each other to form a mass rather than to form discrete particles. Circumscribing the number of extrusion orifices reduces the output of the device. While increasing the speed of the fly knife would increase the pellet production, the speed of the fly knife must be kept down so that safe tip speeds will not be exceeded.

It is an important object of this invention to provide an improved apparatus for producing discrete particles of plastic molding material which will be free from the foregoing and other disadvantages and which will be especially simple in construction and efficient in operation.

Another object of this invention is the provision of a novel apparatus for producing in an efficient and economic manner plastic molding material pellets of small dimensions without danger of the pellets being welded to each other to form a mass.

2

Other objects of this invention, together with certain details of construction and combinations of parts, will appear from the following description and claims.

The apparatus of the present invention may be employed with any plastic which becomes so heat-softened as to be capable of being extruded into the form of small rods or strands of circular or other shape. The apparatus of the invention is particularly applicable for the production of pellets of thermoplastic compositions containing organic derivatives of cellulose such as the organic esters and ethers of cellulose. Examples of such organic esters of cellulose are cellulose acetate, cellulose propionate, cellulose butyrate or mixed esters such as cellulose acetate propionate or cellulose acetate butyrate, while examples of such ethers are ethyl cellulose, methyl cellulose and benzyl cellulose. Other thermoplastic compounds or bases may be used regardless of whether they retain their thermoplastic nature after final molding. Such other plastic materials may be phenol-formaldehyde, urea-formaldehyde, glycerol-phthalic anhydride, and other similar resins and polymerized vinyl and acrylic acid derivatives such as polymerized vinyl acetate, mixed vinyl chloride and vinyl acetate, styrol, methyl methacrylate, etc. which plastic materials are known today in commerce under various names. It is to be understood that the term "plastic" in the claims refers to all such aforementioned materials.

Figure 2:
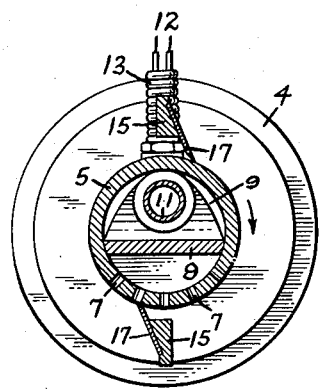
Figure 3:
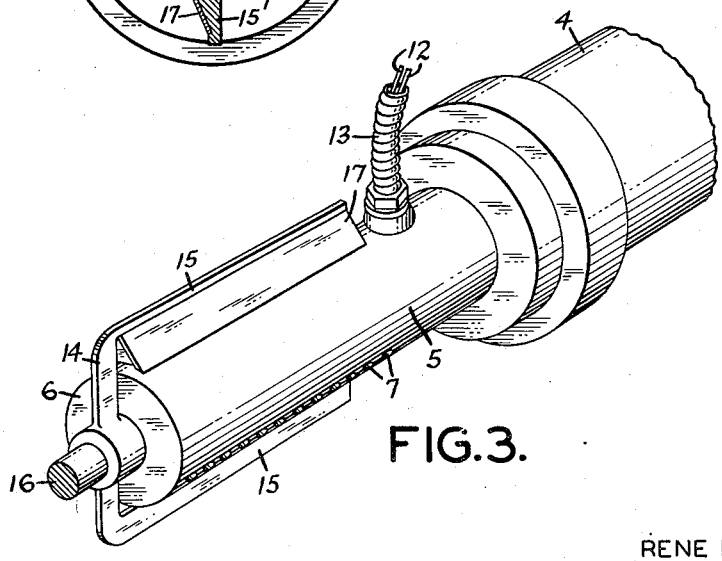

The invention will now be described in greater detail with reference to the accompanying drawing wherein:

Fig. 1 is a longitudinal view, partly in section, of such elements of an apparatus for extruding and cutting plastic strands as are required to disclose the present invention, Fig. 2 is a cross-sectional view taken along line 2—2 in Fig. 1 in the direction of the arrows, and Fig. 3 is a perspective view of the apparatus elements shown in Fig. 1.

Like reference numerals indicate like parts throughout the several views of the drawing.

Referring now to the drawings, the reference numeral 4 indicates an extruder which may be a screw stuffer or other similarly functioning extruder element. Attached to the output end of extruder 4 is a horizontally-extending tubular member 5 which is blanked off at its free end, as shown at 6. A series of orifices 7, which function as extrusion nozzles, are provided in the tubular member 5 along the side thereof which faces downward.

Extending horizontally through the tubular member 5 is a baffle or septum 8 which has a dual function. Thus, it acts to form a channel, to conduct the plastic material issuing from the extruder 4 to the extrusion orifices 7, with a minimum of holdup or dead space. The use of the septum prevents the formation in the upper part of the tubular member of a considerable amount of stagnant material which would be subject to decomposition. A second and very important function of the septum is to provide within the tubular member a space 9 in which can be positioned a tubular electrical heater 11 adapted to maintain the plastic material being extruded at the desired temperature. The heater 11 is provided with leads 12 from any suitable source of current, the leads passing through the wall of the tubular member 5 and being contained in a sheath 13.

To cut the rods issuing from extrusion orifices 7, there is provided a yoke 14 having arms 15 extending in axial relation to tubular member 5. A shaft 16, driven in any suitable manner by any prime mover, is provided to rotate the yoke 14. To the arms 15 are fixed longitudinal knives 17. While two knives are shown, it will be appreciated that any number of knives may be carried by the yoke. However, the more knives employed the lower will be the rotational speed required to produce a predetermined quantity of pellets.

As the yoke is rotated, the knives scrape, cut or slice small segments of the material of the plastic rods being extruded through orifices 7. By properly regulating the rotational speeds of the knives passing over the extrusion orifices, there may be obtained pellets of any desired length which will have a cross-section of the shape of the orifices 7. The diameter of the tubular member 5 is such as to permit a small radius of rotation of the knives. Since the tubular member can be made of any desired length to include any desired number of orifices, the number of strands or rods which may be extruded from the tubular member and cut by the knives may be increased as desired. The knives are rotated at such a predetermined speed that the centrifugal forces which are generated cause the pellets to be thrown off at an angular relation to the tube. The tubular member 5 being angularly adjustable with respect to the extruder 4, it may be turned to place the orifices in such a position that the pellets may be thrown vertically downwards. A water bath is preferably located beneath the tubular member 5 to receive the pellets for the purpose of cooling them.

The reason for placing the extrusion orifices 7 only partially around the tubular member, in addition to the advantages derived from the use of the septum 8, as above described, is that any strands or rods which may be extruded from the extrusion orifices in a vertically upward direction, or even in a horizontal direction, would tend to fall back upon the tubular member and cause clogging.

It is to be understood that the foregoing detailed description is merely given by way of illustration and that many variations may be made therein without departing from the spirit of my invention.

Having described my invention, what I desire to secure by Letters Patent is:

1. In an apparatus for forming pellets of a plastic material, the combination with an extruder, of a tubular member operatively connected to said extruder, said tubular member being angularly adjustable with respect to said extruder and having a plurality of orifices in the peripheral surface thereof, heating means in said tubular member, a septum extending longitudinally of said tubular member and substantially the full length thereof for directing the plastic material towards said orifices and for preventing the plastic material from coming into contact with said heating means, and means extending axially of said tubular member and movable over the surface thereof to sever into pellet size plastic material issuing from said orifices.

2. In an apparatus for forming pellets of a plastic material, the combination with an extruder, of a tubular member, extending in a horizontal direction, operatively connected to said extruder, said tubular member having a plurality of orifices in the lower part of the peripheral surface thereof, heating means in said tubular member, a septum extending longitudinally of said tubular member and substantially the full length thereof for directing the plastic material towards said orifices and for preventing the plastic material from coming into contact with said heating means, and means movable over the surface of said tubular member to sever into pellet size plastic material issuing from said orifices.

3. In an apparatus for forming pellets of a plastic material, the combination with an extruder, of a tubular member, extending in a horizontal direction, operatively connected to said extruder, said tubular member being angularly adjustable with respect to said extruder and having a plurality of orifices in the lower part of the peripheral surface thereof, heating means in said tubular member, a septum extending longitudinally of said tubular member and substantially the full length thereof for directing the plastic material towards said orifices and for preventing the plastic material from coming into contact with said heating means, and means movable over the surface of said tubular member to sever into pellet size plastic material issuing from said orifices.

4. In an apparatus for forming pellets of a plastic material, the combination with an extruder, of a tubular member, extending in a horizontal direction, operatively connected to said extruder, said tubular member being angularly adjustable with respect to said extruder and having a plurality of orifices in the lower part only of the peripheral surface thereof, heating means in said tubular member, a septum extending longitudinally of said tubular member and substantially the full length thereof for directing the plastic material towards said orifices and for preventing the plastic material from coming into contact with said heating means, and a plurality of knives extending axially of said tubular member and movable over the surface thereof to sever into pellet size plastic material issuing from said orifices.

RENE P. PIPEROUX.

References Cited in the file of this patent

UNITED STATES PATENTS

| Number | Name | Date |
| --- | --- | --- |
| 410,822 | Day | Sept. 10, 1889 |
| 1,368,658 | Royle | Feb. 15, 1921 |
| 1,952,556 | MacFarlane | Mar. 27, 1934 |
| 2,286,405 | Gordon | June 16, 1942 |
| 2,319,859 | Hale | May 25, 1943 |